Patented June 29, 1937

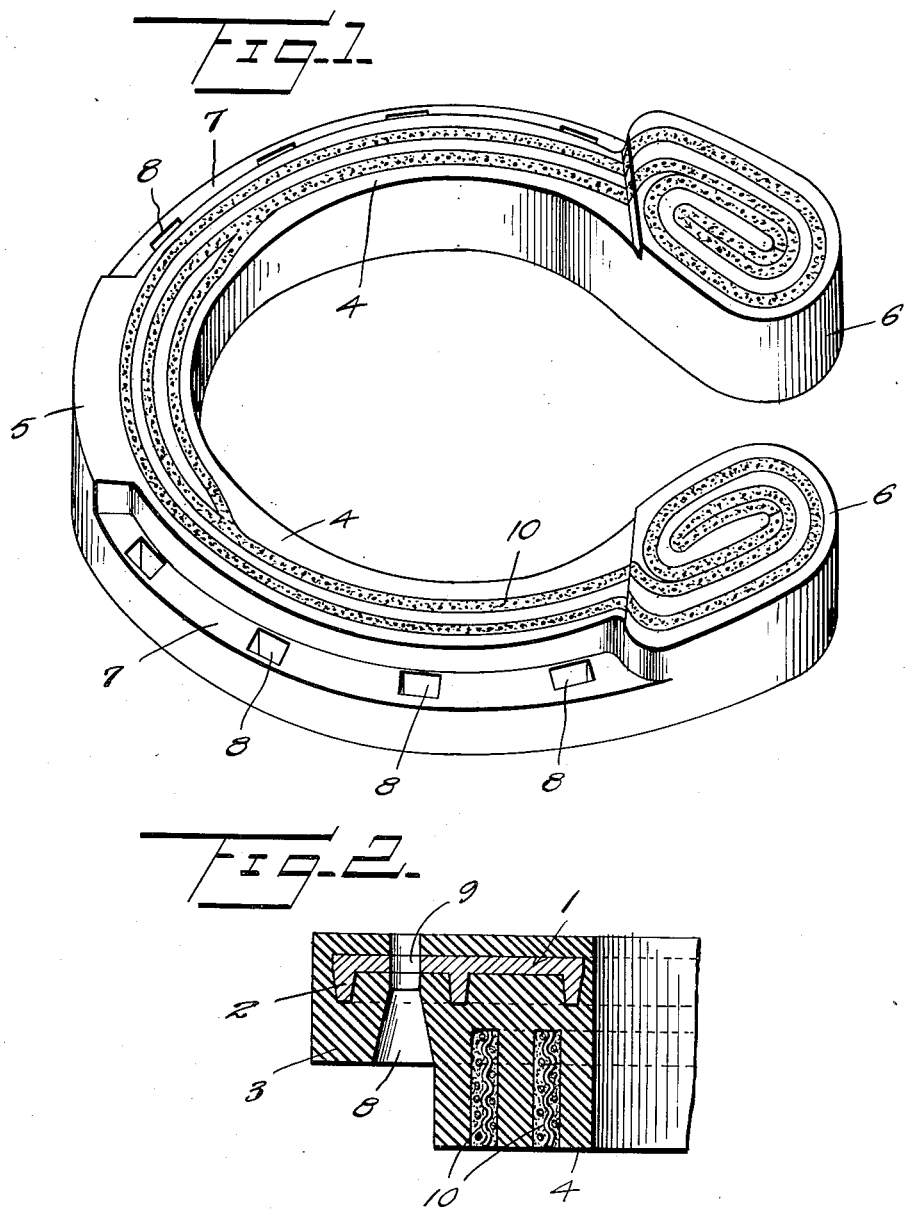

2,085,347

UNITED STATES PATENT OFFICE 2,085,347

NOISELESS ANTISKID HORSESHOE

Vincent P. Wachter, Joliet, Ill.

Application December 5, 1936, Serial No. 114,487

3 Claims. (Cl. 168—13)

This invention relates to the class of horseshoes and pertains particularly to shoes of the noise preventing and anti-skid type.

The present invention has for its primary object to provide an improved rubber horseshoe having combined therewith in a novel manner, material which will prevent the shoe from slipping on wet or icy surfaces.

Another object of the invention is to provide an improved rubber horseshoe having embedded therein a woven material which has its edge exposed on the under or ground engaging surface of the shoe so as to provide a frictional contact with the ground or other surface upon which the shoe is placed, which will prevent the shoe from shifting over the said surface.

Still another object of the invention is to provide a horseshoe of the type consisting of a metal frame having a rubber covering, with inserts of combined woven asbestos and wire threads, so placed that the edges of the combined woven threads will be exposed for contact with the ground surface and thus form an effective anti-skid medium.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view in perspective of a rubber horseshoe constructed in accordance with the present invention, viewing the bottom or undersurface of the shoe.

Figure 2 is a transverse sectional view through the shoe showing the supporting and reinforcing metal part thereof.

In the present art of manufacturing rubber horseshoes, a metal shoe, such as is indicated by the numeral 1, is provided upon which the rubber material is mounted. This metal shoe provides the necessary rigidity to the complete shoe and also provides a reinforcement for the rubber which prevents the securing nails by which the shoe is secured to the horse's hoof from being pulled out of the shoe. In carrying out the present invention, the reinforcing metal portion 1 is provided with three ribs upon its underside, as indicated by the numeral 2, whereas in shoes constructed in accordance with the present methods, there are only two of these ribs employed.

The reinforcement 1 extends throughout the shoe from one heel portion to the other and is covered completely by the rubber body which is generally designated by the numeral 3. This rubber body upon the underside of the shoe has a tread portion 4, a toe portion 5 which has its undersurface in the same plane with the tread and the enlarged heel portions 6, and between the heel portions and the toe 5, the outer corner of the tread is cut back forming the recess 7, the top wall of which is provided with nail holes 8 which coincide with similar holes formed through the metal reinforcement 1, as indicated at 9 in Figure 2.

The present invention consists in providing the tread area 4 throughout the extent of the shoe from one heel portion to the other, with insertions of a material which will contact the ground and prevent the shoe slipping upon wet or icy surfaces. This material constitutes a part of the tread and consists of woven wire and asbestos filaments which are made up in the fabric indicated generally by the numeral 10. This fabric is in the form of strips inserted into the molded rubber so as to be vertically disposed and to have the under or bottom edges thereof exposed for contact with the supporting ground surface, with the adjacent under surface of the surrounding rubber material. As shown in Figure 1, the asbestos wire fabric strips are disposed in spaced parallel relation in the rubber body of the shoe and in the heel portion which is of greater thickness than the portion between the heels and the toe, the strips of fabric being rolled so that the number of ground engaging edges is increased through these two terminal parts of the shoe. Adjacent the toe portion, an additional insert of the woven fabric is made so that an additional ground gripping effect can be had in this part.

From the foregoing, it will be readily apparent that a shoe constructed in accordance with the present invention will be noiseless and at the same time will provide an effective anti-skid means because of the incorporation with the rubber of the strips of woven wire and asbestos which have their edges presented to the ground for contact therewith. Certain of the strands of woven asbestos and wire fabric will run through the shoe from one heel portion to the other and the transversely related strands will have their ends exposed so as to provide minute points which will cut into the underlying surface and prevent the shoe from slipping.

What is claimed is:—

1. An improved noiseless and anti-skid horseshoe, comprising a shoe body of molded reinforced rubber having a tread surface, and inserts of woven wire and asbestos material embedded in the rubber body in a position to have edges of the materials exposed through and forming part of the said tread surface.

2. A noiseless anti-skid horseshoe, comprising a shoe body of reinforced molded rubber having a tread surface, and strips of woven strands of material embedded in the rubber, the said strips of material having edges exposed at and forming a part of the tread surface and extending throughout the length of the tread surface and said strips further being involutely coiled at each heel portion of the horseshoe to provide additional anti-skidding action.

3. An improved noiseless and anti-skid horseshoe, comprising a molded rubber body mounted upon a reinforcing frame, said body having two enlarged heel portions and a toe portion, one face of said body constituting a tread surface, and a plurality of strips of fabric formed of interwoven strands of wire and asbestos, embedded in the rubber and extending throughout the length of the shoe from one heel portion to the other, said strips being arranged on edge whereby each will have an edge exposed through said tread surface, and the strips being involutely coiled upon themselves in the heel portions of the shoe whereby to provide additional exposed edges for engagement with the ground surface.

VINCENT P. WACHTER.